US007525692B2

(12) United States Patent
Nakaya

(10) Patent No.: US 7,525,692 B2
(45) Date of Patent: Apr. 28, 2009

(54) METHOD AND APPARATUS FOR IMAGE READING CAPABLE OF OBTAINING ADEQUATE WHITE REFERENCE DATA FOR SHADING CORRECTION

(75) Inventor: Kazuhiko Nakaya, Nagoya (JP)

(73) Assignee: RICOH Company Ltd., Tokyo (JP)

( * ) Notice: Subject to any disclaimer, the term of this patent is extended or adjusted under 35 U.S.C. 154(b) by 934 days.

(21) Appl. No.: 10/798,570

(22) Filed: Mar. 12, 2004

(65) Prior Publication Data
US 2004/0179242 A1 Sep. 16, 2004

(30) Foreign Application Priority Data
Mar. 12, 2003 (JP) ............... 2003-066781

(51) Int. Cl.
*H04N 1/04* (2006.01)
(52) U.S. Cl. .................. 358/461; 358/496; 358/498
(58) Field of Classification Search ............... 358/461, 358/486, 496, 498, 483, 482, 408, 474, 505, 358/512–514; 382/274, 312, 318, 319; 399/367; 250/234–236
See application file for complete search history.

(56) References Cited
U.S. PATENT DOCUMENTS
5,812,172 A * 9/1998 Yamada .................... 347/171
6,323,933 B1 11/2001 Anzai
2002/0033968 A1 3/2002 Chen

FOREIGN PATENT DOCUMENTS

| JP | 61290858 | A | * | 12/1986 |
| JP | 03052377 | A | * | 3/1991 |
| JP | 5-319613 | | | 12/1993 |
| JP | 6-189075 | | | 7/1994 |
| JP | 10-136167 | | | 5/1998 |
| JP | 10-224571 | | | 8/1998 |
| JP | 2001-16412 | | | 1/2001 |
| JP | 2001-69325 | | | 3/2001 |
| JP | 2001-298592 | | | 10/2001 |
| JP | 2002-152474 | | | 5/2002 |

OTHER PUBLICATIONS

U.S. Appl. No. 09/983,860, filed Oct. 26, 2001, Ando et al.
U.S. Appl. No. 10/798,570, filed Mar. 12, 2004, Nakaya.

* cited by examiner

*Primary Examiner*—Cheukfan Lee
(74) *Attorney, Agent, or Firm*—Oblon, Spivak, McClelland, Maier & Neustadt, P.C.

(57) ABSTRACT

An image reading method and apparatus. A reader is mounted and reads one side of an original document being conveyed at a reading position. A contact glass includes a surface contacting the original document. A reference is disposed at a side of the contact glass opposite to the surface and movable between the reading position and a standby position. The reference includes a surface facing the reader which has a predetermined color for providing shading data used for a shading correction. A carrier moves the reference to the reading position. The reader obtains the shading data by reading the predetermined color on the surface of the reference at the reading position.

18 Claims, 10 Drawing Sheets

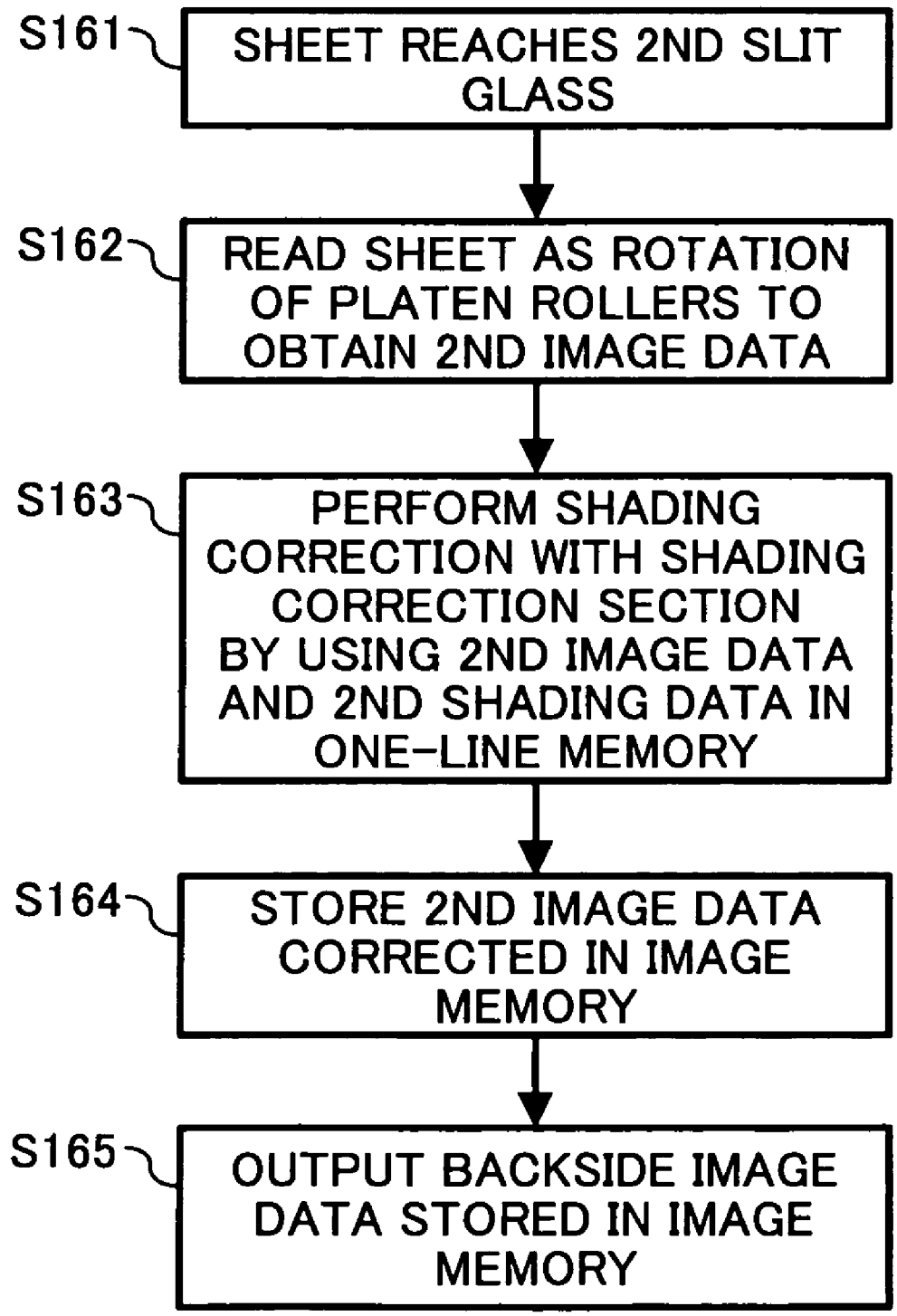

METHOD AND APPARATUS FOR IMAGE READING CAPABLE OF OBTAINING ADEQUATE WHITE REFERENCE DATA FOR SHADING CORRECTION

BACKGROUND OF THE INVENTION

1. Field of the Invention

The present invention relates to a method and apparatus for image reading, and more particularly to a method and apparatus for image reading having a fixed reader capable of obtaining adequate white reference data used for a shading correction by protecting a white reference section read by the reader against dust or motes.

2. Discussion of the Related Art

Duplex image scanners have been developed capable of reading front and back sides of double-sided original documents with high quality at high speed. Such a duplex image scanner generally includes a flatbed unit and an automatic document feeder (ADF) unit.

The flatbed unit includes a contact glass and a first optical system. The first optical system moves back and forth in a sub-scanning direction beneath the contact glass. The scanner carries out a main scanning and a sub-scanning on an original document which has been set manually or transferred by the ADF onto the contact glass. The ADF unit is provided with an ADF reading glass to which the first optical system moves to read one side of the original document being conveyed. The ADF unit is also provided with a second optical system which is placed on a downstream side of a document conveying path and reads the other side of the document being conveyed.

In the image scanner, there arise problems such as fluctuations in light amount of a lamp or variations in sensitivity of photosensitive pixels in a photoelectric conversion element like a charge-coupled device (CCD). To overcome these problems, the scanner performs a shading correction on original image data by using the white reference data obtained by reading a white reference plate.

The duplex image scanner is provided with the first optical system in the flatbed unit and the second optical system in the ADF unit. The scanner is also provided with a first white reference plate and a second white reference plate used by the first and second optical systems, respectively. The first white reference plate is provided just beneath the contact glass in order to protect the plate against dust, paper powder, motes, and so on caused by motion of the first optical system. The first optical system is moved under the white reference plate to read a predetermined length of the white reference plate irradiated with a lamp. The first white reference plate is provided beneath the contact glass, where contact with the dust or motes is prevented. However, the first white reference plate is still susceptible to undesired substances caused by gas of the lamp or motion of the scanning members. To avoid these problems, a conventional duplex image scanner does not read only one line, but reads a plurality of lines over a length of several millimeters of the first white reference plate, and averages the data obtained to generate shading data for one line. The shading data is stored in a memory and used in the shading correction to the image data of the original document.

As for the second optical system which is fixed to the ADF, the second white reference plate is disposed directly under the second optical system on the document conveying path. When no document exists on a scanning line of the second optical system, the second optical system reads the second white reference plate to obtain shading data, as described in Japanese Patent Laid-Open Application Publication No. 2001-16412.

Since the second optical system is immovable, it reads one line of the second white reference plate once or more to obtain shading data.

When there are dust particles or motes on the scanning line of the second optical system, the shading data would be of no help to remove fluctuations in light amount or variations in sensitivity of photosensitive pixels in a CCD sensor, failing to satisfy its intended purpose. Using such shading data in the shading correction might cause undesired lines in the image being processed, thereby reducing quality of the image. In a case of a scanner with a resolution of 600 dpi, for example, even a small grain of dust may cause a problem to the image of a size equivalent to 0.0423 mm, a line width of the scanner.

Moreover, being disposed directly under the second optical system where the original document passes through, the scanning line of the second white reference plate is susceptible to paper powders that have fallen from the document, thereby often reducing quality of the image being processed.

Alternatively, some image reading apparatuses include a white platen roller. In order to suppress an adverse effect of dust or motes, the white platen roller rotates when the image reading apparatus reads shading data, as described in Japanese Patent Laid-Open Application Publication No. Hei 05-319613.

Even if the above technique is applied, however, it is still difficult to protect the white platen roller against dust or motes inevitably existing in the air. Inevitably, over the course of time, paper dust clings to the white platen roller, burning caused by the lamp discolors the roller, gas generated by the lamp causes the roller to deteriorate, and so on. When the second optical system reads data from such a roller, the resultant data may include stains or be of uneven density, thereby reducing the quality of the image.

SUMMARY OF THE INVENTION

In view of the foregoing, it is an object of the present invention to provide a novel image reading apparatus which obtains accurate white reference data used in shading correction by preventing a white reference part from being dirty, thereby increasing a quality of image data processed.

Another object of the present invention is to provide a novel image reading method which obtains accurate white reference data used in shading correction by preventing a white reference part from being dirty, thereby increasing a quality of image data processed.

To achieve these and other objects, in one example, the present invention provides a novel image reading apparatus including a reader, a contact glass, a reference, and a carrier. The reader is immovably mounted and configured to read one side of an original document being conveyed at a reading position. The contact glass includes a surface configured to contact the original document. The reference is disposed at a side of the contact glass opposite to the surface and configured to be movable between the reading position and a standby position. The reference includes a surface configured to face the reader which has a predetermined color to provide shading data used for a shading correction. The carrier is configured to move the reference to the reading position. The reader is configured to obtain the shading data by reading the predetermined color on the surface of the reference at the reading position.

The reader may be configured to read the predetermined color on the surface of the reference at a plurality of locations to obtain data.

The above-mentioned image reading apparatus may further include a calculator configured to average the data to obtain the shading data.

The reader may be configured to sequentially read the predetermined color on the surface of the reference at a plurality of locations according to a motion of the reference.

The above-mentioned image reading apparatus may further include guiding members. The guiding members are configured to supportively guide the reference moving between the standby position and the reading position above the standby position. The reference is configured to slide down, for example by own weight, to the standby position from the reading position when the carrier is deactivated. The reader is configured to read the predetermined color on the surface of the reference at a plurality of locations as the reference moving by own weight slides towards the standby position from the reading position.

The reference may further include a reference sheet and at least one transparent member. The reference sheet has the surface having the predetermined color. The transparent member is configured to cover the surface of the reference sheet facing the reader.

The above-mentioned image reading apparatus may further include a cleaner. The cleaner is configured to contact at least one of the transparent members and to perform cleaning on a surface of the transparent member configured to face the reader. The cleaning is carried out according to a movement of the reference between the reading position and standby position.

Further, in one example, a novel image reading method includes the steps of providing a reader, providing a contact glass, disposing a reference, moving the reference, reading the reference, and obtaining shading data. The reader is provided, which is immovably mounted and configured to read one side of an original document being conveyed at a reading position. A contact glass is provided, which includes a surface configured to contact the original document at the reading position. The reference is disposed at a side of the contact glass opposite to the surface. The reference is movable between the reading position and a standby position, the reference including a surface facing the reader and having a predetermined color to provide shading data used for a shading correction. The reference is moved to the reading position. The predetermined color on the surface of the reference is read at the reading position with the reader to obtain read data. Shading data is obtained from the read data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a flowchart showing a step for processing the other side of the original document in FIG. 6.

DETAILED DESCRIPTION OF PREFERRED EMBODIMENTS

Figure 1:
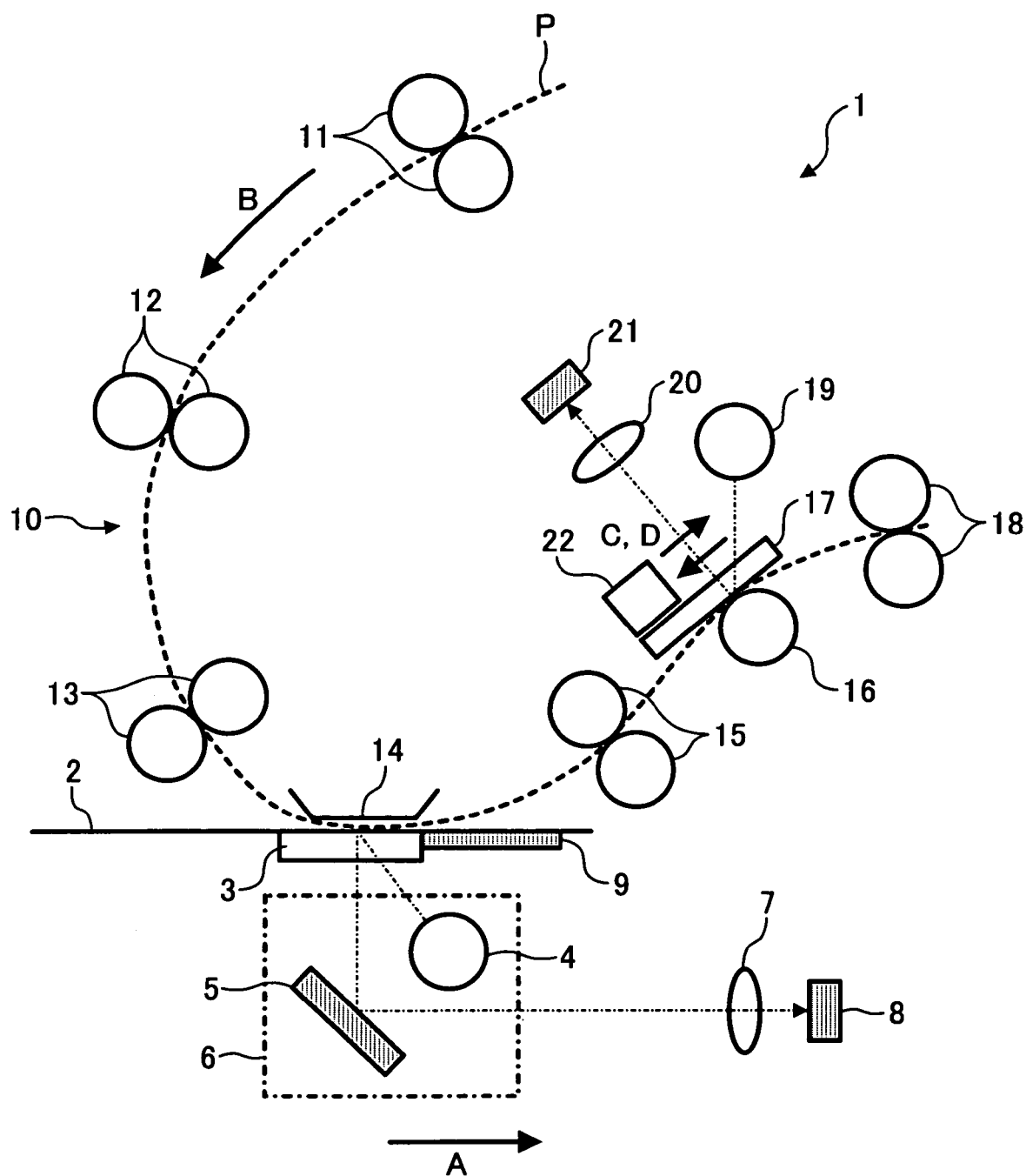
FIG. 1 is a schematic partial cross-sectional view of an image reading apparatus according to an embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an image reading apparatus 1 according to an exemplary embodiment of the present invention is described. In FIG. 1, the image reading apparatus 1 includes a housing unit 2, a first slit glass 3, a first lamp 4, a mirror 5, a carriage 6, a first lens 7, a first charge-couple device (CCD) 8, a white reference plate 9, and an automatic document feeder (ADF) 10. The ADF 10 includes a document table (not shown), a pair of paper feeding rollers 11, a pair of first conveying rollers 12, a pair of second conveying rollers 13, a reflector 14, a third conveying rollers 15, a platen roller 16, a second slit glass 17, a pair of paper output rollers 18, a second lamp 19, a second lens 20, a second CCD 21, and a white reference unit 22. FIG. 1 also shows directions of motions in the image reading apparatus 1. An arrow A shows a sub-scanning direction. An arrow B shows a direction of paper conveying path. Arrows C and D show directions in which the white reference unit 22 moves. The arrows are referred to as direction A, direction B, direction C, and direction D, respectively. P in FIG. 1 indicates a sheet of original document paper being processed.

In FIG. 1, the image reading apparatus 1 is provided with a contact glass (not shown) and the first slit glass 3 on a top face of the housing unit 2. Inside the housing unit 2, the carriage 6, the first lens 7, and the first CCD 8 are disposed underneath the contact glass and the first slit glass 3. The carriage 6 includes components such as the first lamp 4 and the mirror 5. The white reference plate 9 is disposed adjoining the first slit glass 3 inside the top side of the housing unit 2. The carriage 6 is driven to move by a motor (not shown) in the sub-scanning direction A.

The image reading apparatus 1 includes the ADF 10 hinged at the top of the hosing unit 2. When the ADF 10 is opened, an original document can be set on the contact glass (not shown). When the ADF 10 is closed with the original document placed on the contact glass, the ADF acts as a platen member pressing the original document against the contact glass.

The pair of the paper feeding rollers 11 in the ADF 10 separates sheets of paper one by one from a batch set on the document table, and sends a sheet of paper P to the pair of first conveying rollers 12 in the conveying direction B. The pair of first conveying rollers 12 carries the sheet P to the pair of second conveying rollers 13. The pair of second conveying rollers 13 sends the sheet P to a position between the first slit glass 3 and the reflector 14 arranged opposite to the first slit glass 3, and subsequently sends the sheet P to the pair of third conveying rollers 15.

The first lamp 4 irradiates one side, a front side, for example, of the sheet P with a light beam. The mirror 5 reflects the light beam reflected on the front side of the sheet P onto the lens 7. The lens 7 converges the light beam onto the first CCD 8. The first CCD 8 carries out a photoelectric conversion of the light beam. By performing the above operations, the image reading apparatus 1 reads the front side of the sheet P being conveyed, thereby obtaining image data of the front side of the sheet P, or first image data.

Before reading the sheet P, the first CCD 8 reads the white reference plate 9 to obtain and store first shading data to be used in a first shading correction. The first CCD 8 performs the first shading correction on the first image data based on the first shading data. Since the white reference plate 9 may have dust or motes disposed thereon, the image reading apparatus 1 reads the white reference plate 9 over a plurality of lines and averages data obtained to generate the first shading data.

To read the white reference plate 9, the image reading apparatus 1 moves the carriage 6 to a position above which the white reference plate 9 is disposed, and reads the white reference plate 9 over a plurality of lines (n lines) along with a motion of the carriage 6.

The pair of third rollers 15 in the ADF 10 sends the sheet P to a position between the platen roller 16 and the second slit glass 17 where the platen roller 16 and the second slit glass 17 contact both sides of the sheet P. The platen roller 16 is arranged to press against the second slit glass 17. The platen roller further conveys the sheet P, which has been read, to the pair of paper output rollers 18 that ejects the sheet P onto a paper output tray (not shown).

The platen roller 16 conveys the sheet P at the position between the platen roller 16 and the second slit glass 17 while pressing the sheet P against the second slit glass 17. The second lamp 19 irradiates the other side, a back side for example, of the sheet P with a light beam. The second lens 20 converges the light beam onto the second CCD 21. The second CCD 21 carries out photoelectric conversion of the light beam. By performing the above operations, the image reading apparatus 1 reads the back side of the sheet P being conveyed, thereby obtaining an image data of the back side of the sheet P, or second image data. The second lamp 19, the second lens 20, and the second CCD 21 act as reading devices.

Figure 2:
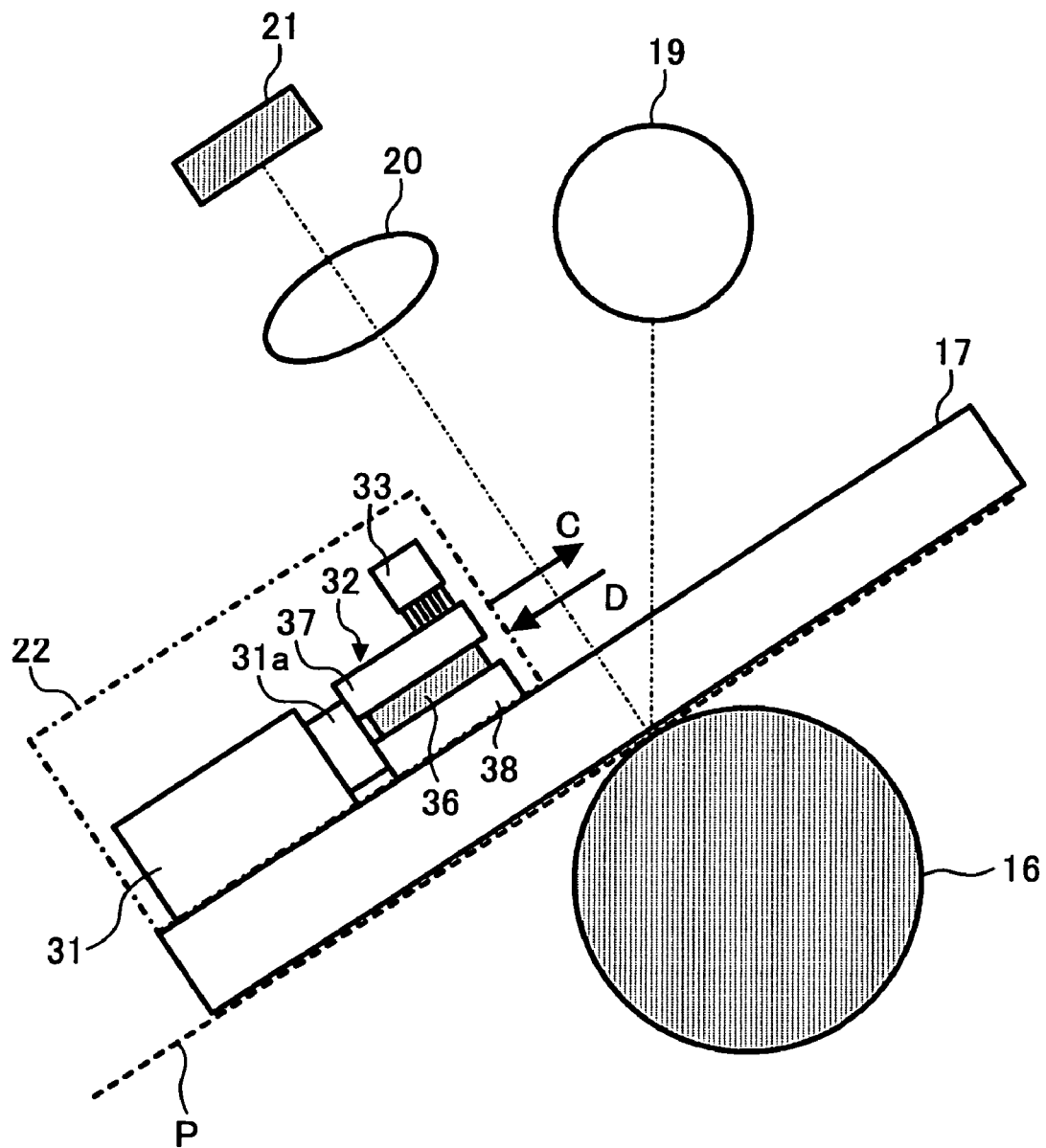
FIG. 2 is an enlarged view of a white reference unit at a standby position with a second optical system of the image reading apparatus of FIG. 1.
Figure 3:
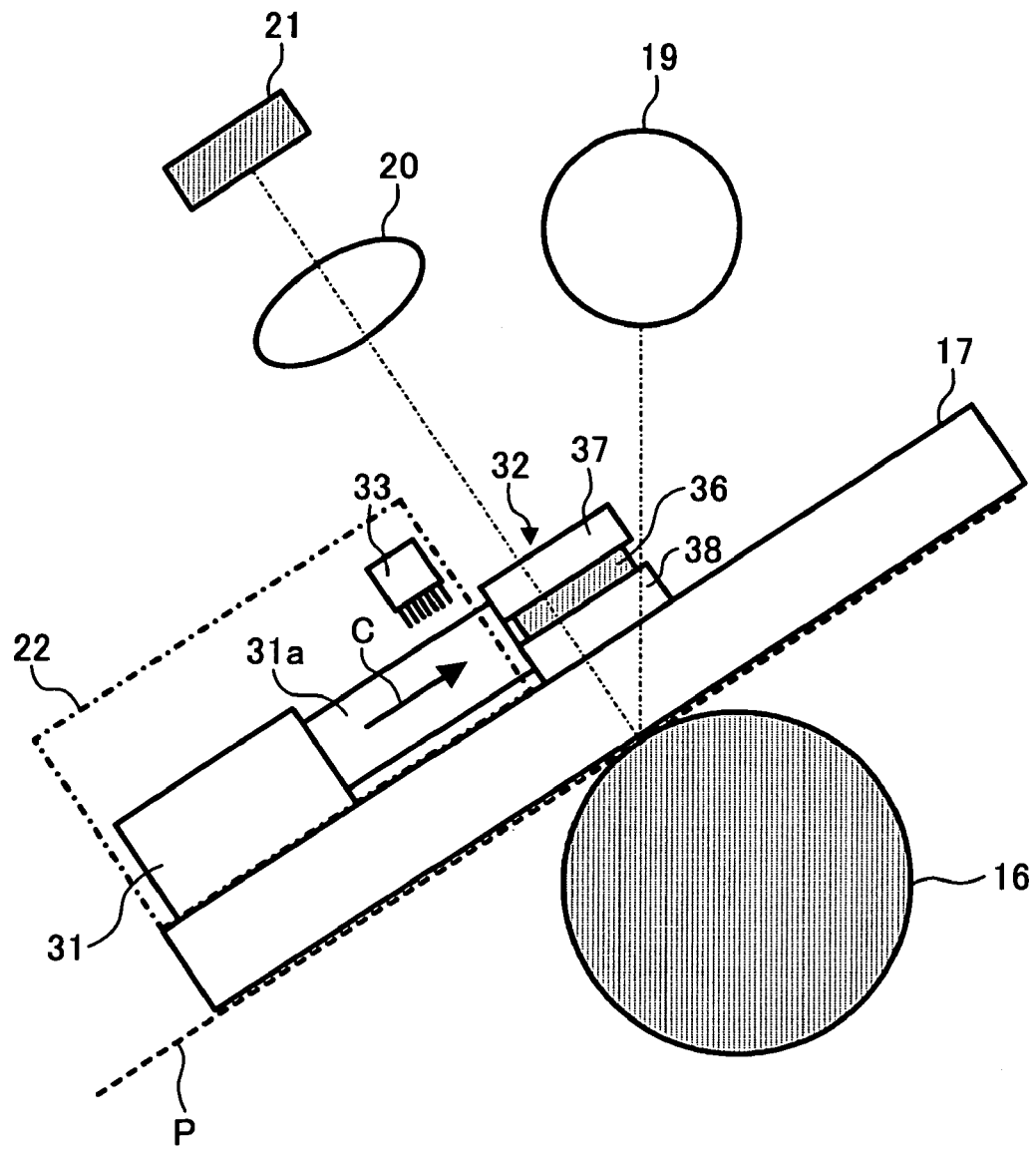
FIG. 3 is an enlarged view of the white reference unit at a reading position with the second optical system of the image reading apparatus of FIG. 1.
Figure 4:
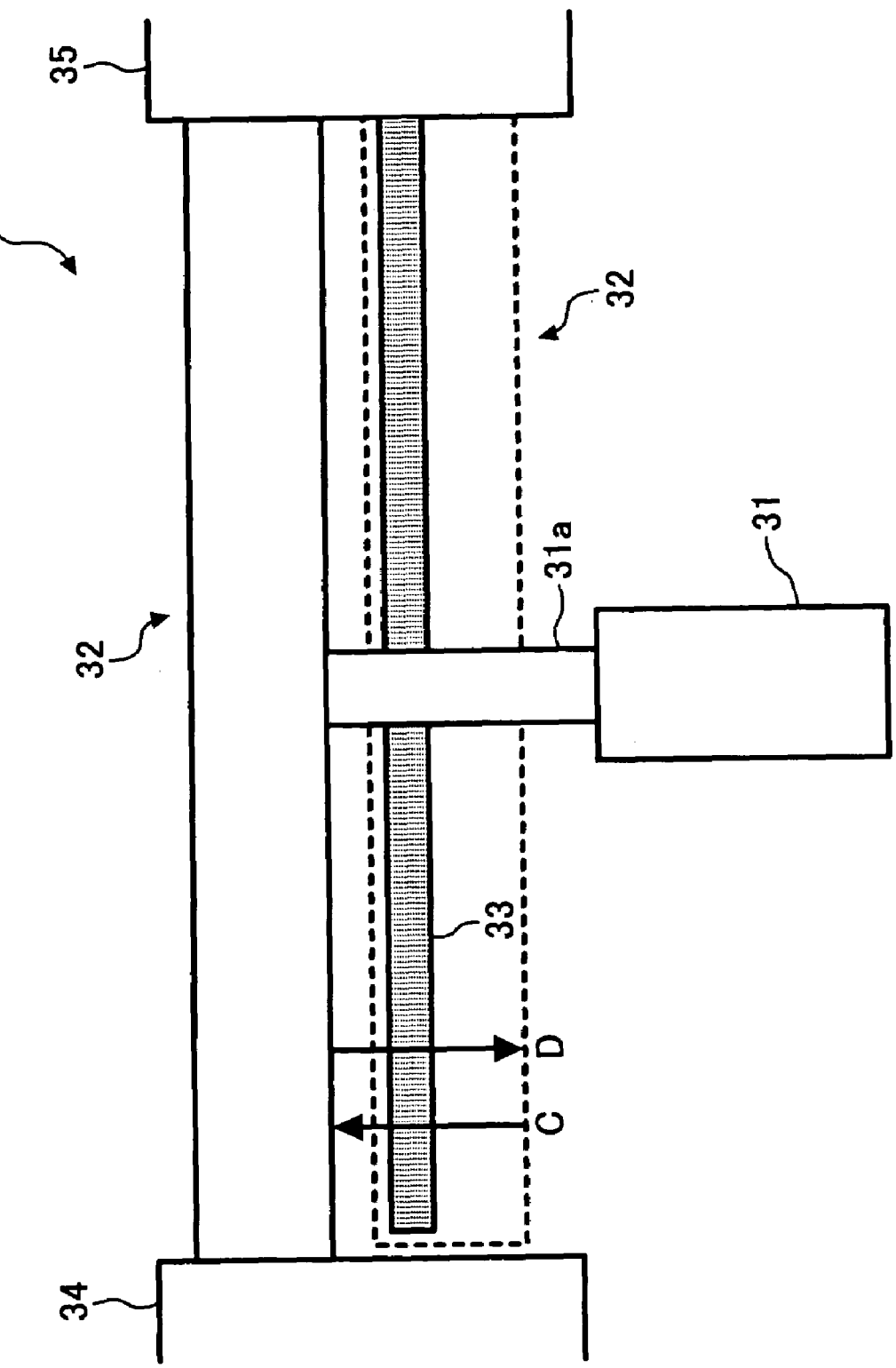
FIG. 4 is a bottom view of the white reference unit of the image reading apparatus of FIG. 3.

With reference to FIGS. 2 through 4, the image reading apparatus 1 is further described. In FIGS. 2 and 3, the white reference unit 22 includes a solenoid 31, an arm 31a of the solenoid 31, a white reference section 32, a dust-removing brush 33, a white reference sheet 36, an upper dustproof glass 37, and a lower dustproof glass 38. In FIG. 4, the white reference unit 22 further includes a pair of guiding rails 34 and 35. As shown in FIGS. 2 and 3, the slit glass 17 is arranged to have a slope along with the conveying path in which a downstream side of the slit glass 17 (a right side in the drawings) is disposed at a higher position than a position of an upstream side of the slit glass 17 (a left side in the drawings). The pair of guiding rails 34 and 35 are arranged to be disposed along the slope of the slit glass 17 and to extend downstream along the conveying path, as shown in FIG. 4. An angle of the slope is preferably between 40 and 60 degrees, and more preferably around 50 degrees. The solenoid 31 acts to move or lift the white reference section 32 in the direction C in FIGS. 2, 3, and 4, while the white reference section 32 slides down to a standby position in the direction D in FIGS. 2 and 4.

The white reference section 32 has a width corresponding to a width of a largest original document size to be processed by the image reading apparatus 1, as shown in FIG. 4. The white reference section 32 includes the white reference sheet 36 enveloped with transparent plate members, i.e., the upper dustproof glass 37 and the lower dustproof glass 38, integrated to prevent contact of impurities such as dust, motes, or paper powders, with the white reference sheet 36. An entire surface of at least an upper side, a side facing the second lamp 19, of the white reference sheet 36 is colored white. The lower dustproof glass 38 may be opaque. Alternatively, the lower dustproof glass 38 can be omitted from the white reference section 32, depending on an arrangement of the white reference sheet 36. The white reference section 32 has a predetermined length in the sub-scanning direction.

The white reference section 32 with the arm 31a of the solenoid 31 remains at a standby position when the solenoid 31 is deactivated (that is, when no driving force from the solenoid 31 is transferred to the arm 31a) as shown in FIG. 2. When the solenoid 31 is activated, the driving force from the solenoid 31 is transferred to the arm 31a to lift the white reference section 32 towards a position at which the white reference is read, i.e., the reading position of the second CCD 21, in the direction C.

FIG. 3 shows the solenoid 31 activated. When the solenoid 31 is deactivated, the white reference section 32 smoothly slides down along with the guiding rails 34 and 35 in the direction D shown in FIG. 2, and finally returns to the standby position. This motion is caused by the slope of the guiding rails 34 and 35 in which their ends at the side of solenoid 31 are arranged at a lower position than the other ends at the side of white reference section 32.

When disposed in the standby position, the white reference section 32 is at a position away from the reading position of the second CCD 21, as shown in FIG. 2. The light beam emitted from the second lamp 19 irradiates the sheet P pressed by the platen roller 16 against the second slit glass 17, reflects off of the sheet P, and passes through the slit glass 17. When the white reference section 32 is disposed in the standby position, the light beam passes through the lens 20 to be detected by the second CCD 21, without being blocked by the white reference section 32.

When the white reference section 32 is disposed at the reading position of the second CCD 21, however, the light beam emitted from the second lamp 19 passes through the upper dustproof glass 37 of the white reference section 32 and irradiates the white reference sheet 36. The light beam reflects off of the white reference sheet 36 and passes through the lens 20 to be detected by the second CCD 21.

In order to obtain shading data, the image reading apparatus 1 first activates the solenoid 31 that lifts the white reference section 32 to the reading position of the second CCD 21, and subsequently deactivates the solenoid 31. When the solenoid 31 is deactivated, the white reference section 32 gradually slides down to the standby position along with the guiding rails 34 and 35. The white reference section 32 has the predetermined length in the sub-scanning direction as described above. According to this motion, the predetermined length of the white reference sheet 36 is irradiated with the light beam emitted from the second lamp 19. The light beam is reflected off of the white reference sheet 36 and detected by the second CCD 21 through the lens 20. In this way, the image reading apparatus 1 reads the predetermined length of the white reference sheet 36 over a plurality of lines to obtain shading data.

The dust-removing brush 33 includes a tip portion of a brush part that is arranged to contact the upper dustproof glass 37 of the white reference section 32. When the white reference section 32 moves between the! standby position and the reading position, the dust-removing brush 33 cleans away impurities such as dust, motes, or paper dust, on an upper surface of the upper dustproof glass 37.

Figure 5:
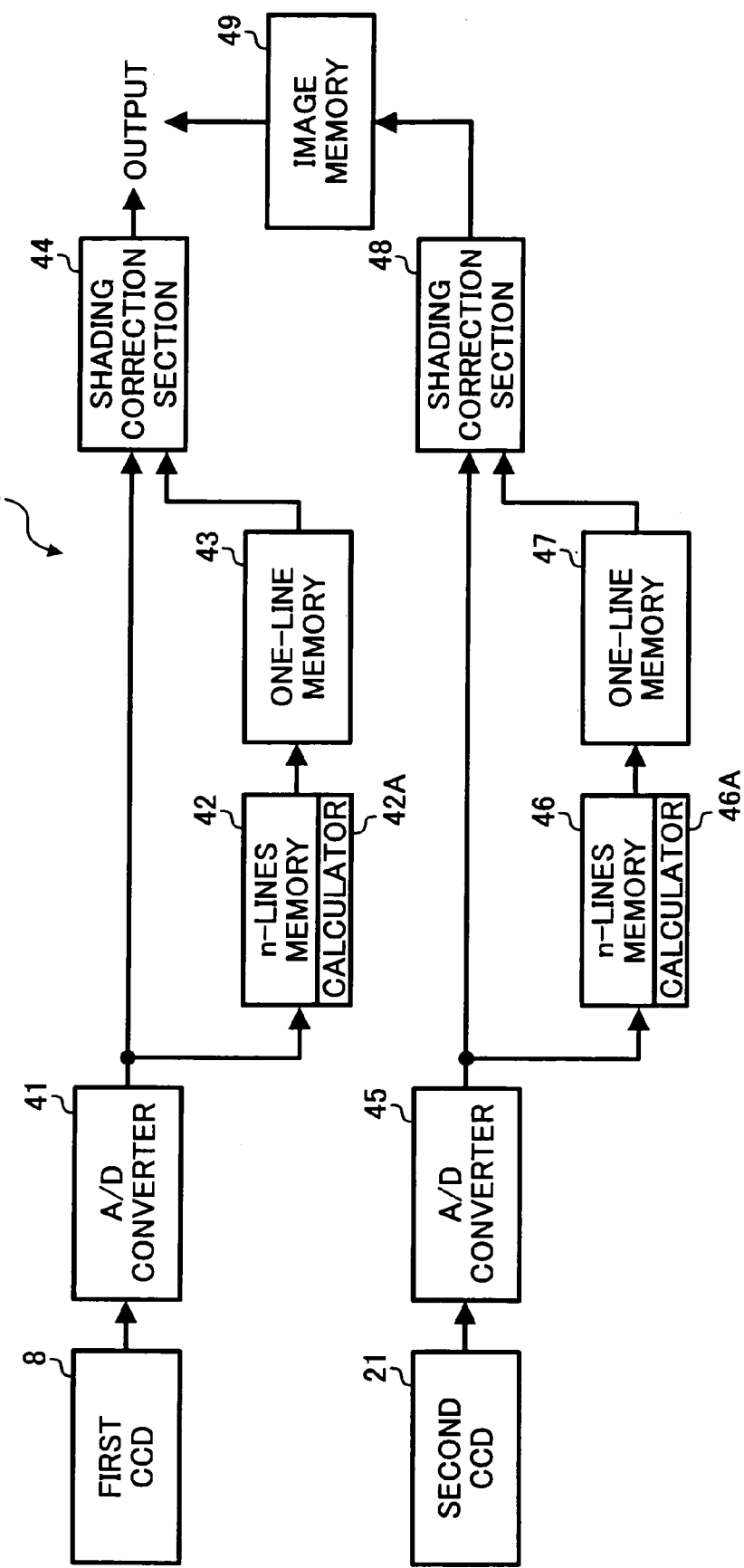
FIG. 5 is a block diagram showing an image processing circuit of the image reading apparatus of FIG. 1.

With reference to FIG. 5, an exemplary circuit of the image reading apparatus 1 is described. The image reading apparatus 1 includes a circuit for an image processing, as shown in FIG. 5. The circuit includes an A/D converter 41, a n-lines memory 42, a calculator 42A, a one-line memory 43, a shading correction section 44, an A/D converter 45, a n-lines memory 46, a calculator 46A, a one-line memory 47, a shading correction section 48, and an image memory 49. An image signal from the first CCD 8 is processed with the A/D converter 41, the n-lines memory 42, the calculator 42A, the one-line memory 43, and the shading correction section 44, while an image signal from the second CCD 21 is processed with the A/D converter 45, the n-lines memory 46, the calculator 46A, the one-line memory 47, the shading correction section 48, and the image memory 49.

To obtain shading data, the image reading apparatus 1 initially reads the white reference plate 9 over a plurality of lines (n lines) with the first CCD 8, as described above. The data obtained is sequentially converted with the A/D converter 41 into digital form and stored in the n-lines memory 42. The data stored in the n-lines memory 42 is averaged in each pixel with the calculator 42A, and resultant data is stored in the one-line memory 43 as first shading data. In addition, the image reading apparatus 1 reads the white reference sheet 36 over a plurality of lines (n lines) with the second CCD 21. In a similar manner, the data obtained is sequentially converted with the A/D converter 45 into digital form and stored in the n-lines memory 46. The data stored in the n-lines memory 46 is averaged in each pixel with the calculator 46A, and resultant data is stored in the one-line memory 47 as second shading data.

In order to read the double-sided sheet P, the image reading apparatus 1 reads one side (the front side) of the sheet P at first to obtain the first image data, converts the first image data into digital form with the A/D converter 41, and outputs the first digital data to the shading correction section 44. The shading correction section 44 performs the shading correction based on the first shading data stored in the one-line memory 43 on the first image data of the double-sided sheet P. The shading correction section 44 outputs the corrected first image data.

The image reading apparatus 1 also reads the other side (the back side) of the sheet P to obtain the second image data, converts the second image data into digital form with the A/D converter 45, and outputs the second digital data to the shading correction section 48. The shading correction section 48 performs the shading correction based on the second shading data stored in the one-line memory 47 on the second image data. The corrected second data is temporarily stored in the image memory 49. After performing the shading correction on the first image data read with the first CCD 8 and outputting the corrected data, the image reading apparatus 1 performs the shading correction on the second image data read with the second CCD 21 and stored in the image memory 49, and outputs the corrected data.

Figure 6:
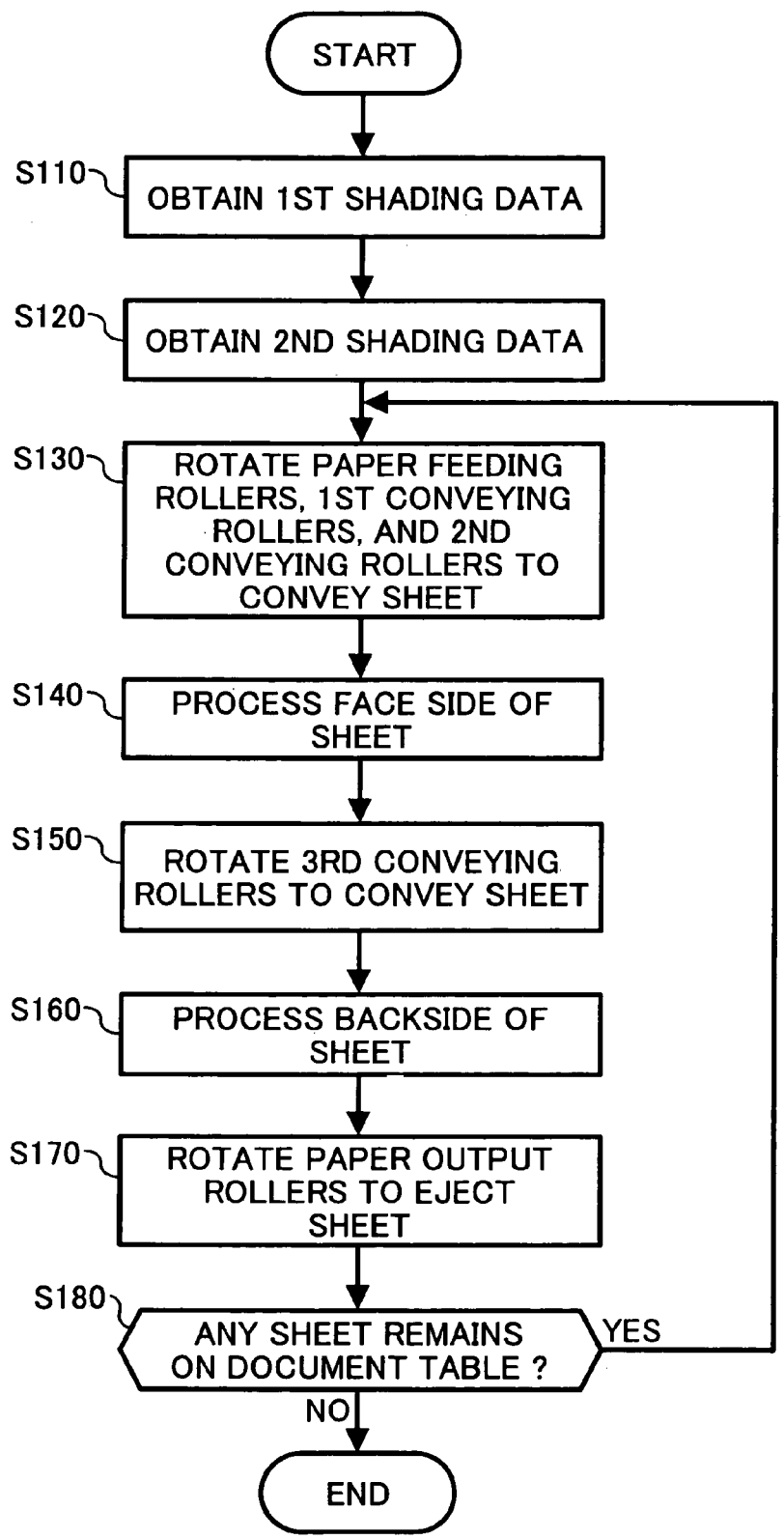
FIG. 6 is a flowchart showing steps for processing a double-sided original document according to the apparatus 1 of FIG. 1.

With reference to FIGS. 6 through 10, the exemplary procedure of an image reading operation according to an exemplary embodiment of the present invention is described. FIG. 6 outlines steps for the image reading operation by the image reading apparatus 1 as follows: obtaining a first shading data in Step S110; obtaining a second shading data in Step S120; conveying a sheet P to a first reader in Step S1130; processing a front side of the sheet P in Step S140; conveying the sheet P to a second reader in Step S150; processing a back side of the sheet P in Step S160; and ejecting the sheet P in Step S170.

When there is at least one sheet of paper remaining on the document table in Step S180, the operation returns to Step S130. When no sheet of paper remains on the document table, the operation goes to END.

Figure 7:
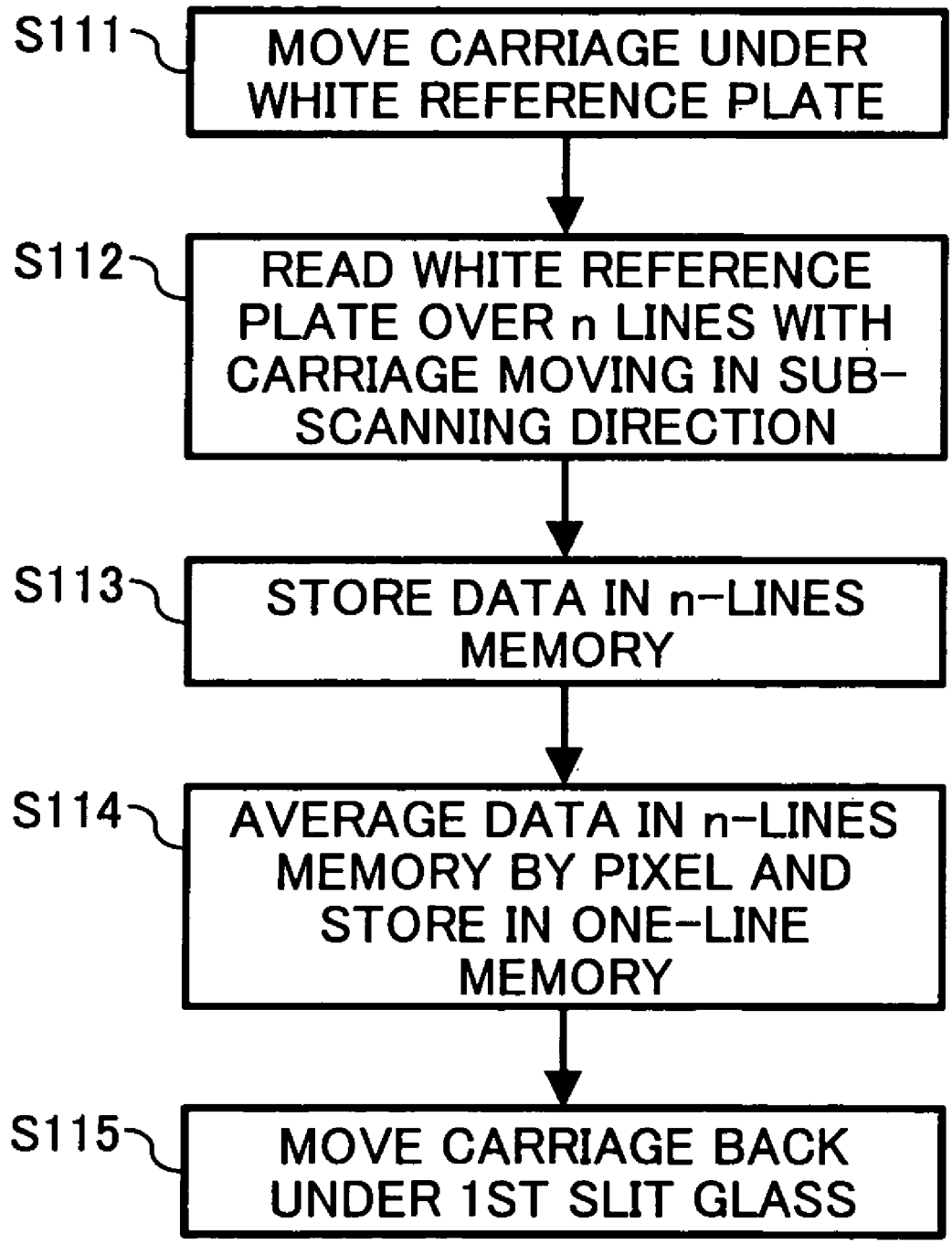
FIG. 7 is a flowchart showing a step for obtaining first shading data in FIG. 6.

Before starting the reading operation of the a double-sided original document sheet P, the sheet P is set on the document table, information such as a resolution or a number of copies is set from an operating unit, and a start key is pressed. FIG. 7 shows steps for obtaining first shading data, that is, Step S110 in FIG. 6. In order to obtain the first shading data, the image reading apparatus 1 first moves the carriage 6 under the white reference plate 9 in Step S111. In Step S112, the first lamp 4 irradiates the white reference plate 9 with a light beam. The light beam reflected off of the white reference plate 9 is detected by the first CCD 8 through the mirror 5 and the lens 7, thereby causing the image reading apparatus 1 to read the white reference panel 9. In parallel, the image reading apparatus 1 moves the carriage 6 in the direction A to read over n lines of the white reference panel 9.

In Step S113, the A/D converter 41 converts data obtained by reading n lines of the white reference plate 9 into digital form. The converted data is sequentially stored into the n-lines memory 42. In Step S114, the data in the n-lines memory 42 is averaged in each pixel with the calculator 42A, and stored in the one-line memory 43 as first shading data.

In Step S115, the image reading apparatus 1 moves the carriage 6 back under the first slit glass 3, preparing for a reading operation of the sheet P.

Figure 8:
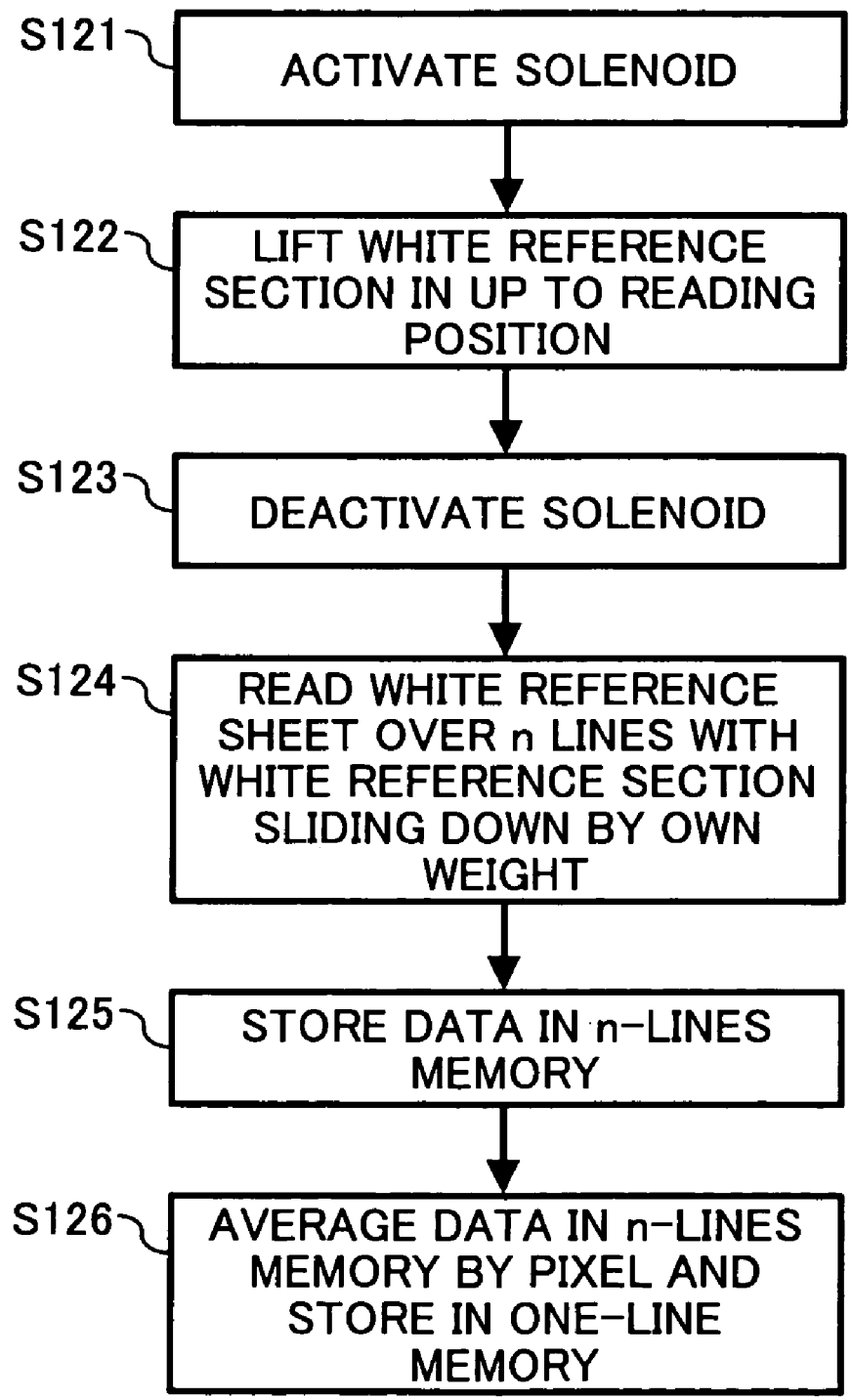
FIG. 8 is a flowchart showing a step for obtaining second shading data in FIG. 6.

FIG. 8 shows steps for obtaining second shading data, that is, Step S120 in FIG. 6. In order to obtain the second shading data, the image reading apparatus 1 activates the solenoid 31 in Step S121, moves the arm 31a in the direction C shown in FIGS. 2 to 4 towards the position at which the white reference section is read in Step S122, and deactivates the solenoid 31 in Step S123.

When the solenoid 31 is deactivated, the white reference section 32 smoothly slides down along the guiding rails 34 and 35 in the direction D shown in FIG. 2, and finally returns to the standby position. This motion is caused by an arrangement of the guiding rails 34 and 35 in which their ends at the side of the solenoid 31 are disposed at a lower position than the other ends at the side of white reference section 32.

In Step S124, the second lamp 19 irradiates the white reference section 32 returning towards the solenoid 31 along the guiding rails 34 and 35 with a light beam. The light beam reflected off of the white reference section 32 is detected by the second CCD 21 through the lens 20, thereby causing the image reading apparatus 1 to read over n lines of the white reference sheet 36.

In Step S125, the A/D converter 45 converts data obtained by reading n lines of the white reference sheet 36 into digital form. The converted data is sequentially stored into the n-lines memory 46. In Step S126, the data in the n-lines memory 46 is averaged in each pixel with the calculator 46A, and stored in the one-line memory 47 as second shading data.

Upon storing the second shading data in the one-line memory 47 which indicates completion of obtaining shading data, the image reading apparatus 1 drives the pair of paper feeding rollers 11, the pair of first conveying rollers 12, and the pair of second conveying rollers 13 to rotate, and sends the sheet P on the document table to a position between the first slit glass 3 and the reflector 14 in Step S130 in FIG. 6.

Figure 9:
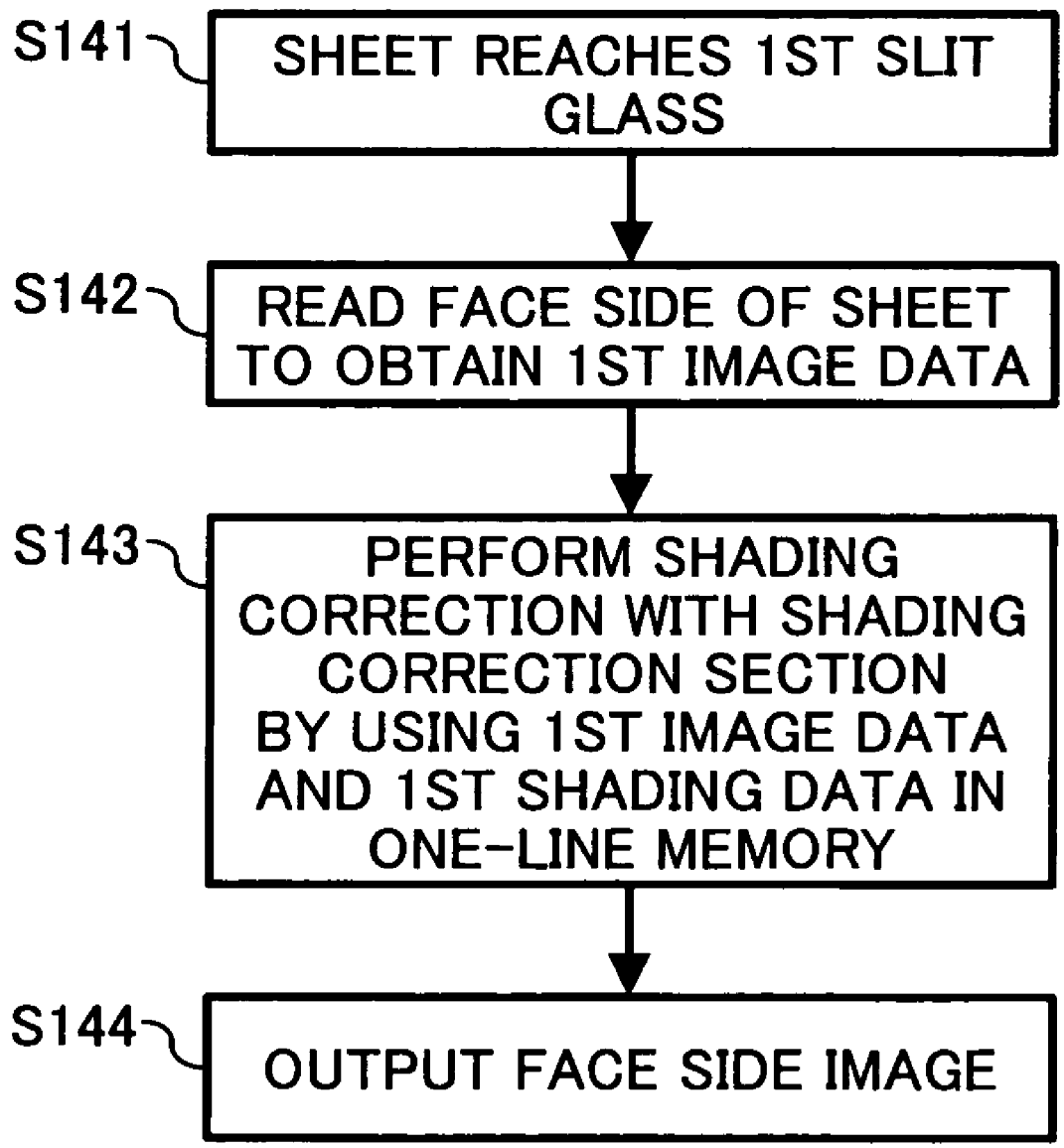
FIG. 9 is a flowchart showing a step for processing one side of an original document in FIG. 6.

FIG. 9 shows steps for processing the front side of the sheet P, that is, Step 5140 in FIG. 6. In Step S141, the sheet P is conveyed to the first slit glass 3. In Step S142, the first lamp 4 irradiates one side (the front side) of the sheet P with a light beam. The mirror 5 reflects the light beam reflected off of the front side of the sheet P onto the lens 7. The lens 7 converges the light beam on the first CCD 8. The first CCD 8 carries out photoelectric conversion of the light beam. By performing the above operations, the image reading apparatus 1 reads the front side of the sheet P being conveyed, thereby obtaining an image data of the front side of the sheet P, or first image data.

In Step S143, an image signal output from the first CCD 8 is converted into digital form with the A/D converter 41. The converted data is output as original image data into the shading correction section 44. The shading correction section 44 performs a shading correction on the first image data based on the first shading data stored in the one-line memory 43. The first image data of the sheet P corrected is output in Step S144.

Then, the image reading apparatus 1 rotates the pair of third rollers 15 to further convey the sheet P, in Step S150 in FIG. 6.

FIG. 10 shows steps for processing the back side of the sheet P, that is, Step S160 in FIG. 6. In Step S161, the sheet P is conveyed to a position between the second slit glass 17 and the platen roller 16. In Step S162, the image reading apparatus 1 reads the other side (the back side) of the double-sided sheet P as rotating the platen roller 16. At this point, the white reference section 32 is disposed at the standby position that does not block a path of the light beam emitted from the second lamp 19. The light beam irradiates the back side of the sheet P being conveyed between the second glass 17 and the platen roller 16. The light beam is reflected off of the back side of the sheet P. The second lens 20 converges the light beam on the second CCD 21. The second CCD 21 carries out photoelectric conversion of the light beam. By performing the above operations, the image reading apparatus 1 reads the back side of the sheet P being conveyed, thereby obtaining image data of the back side of the sheet P, or second image data.

In Step S163, an image signal output from the second CCD 21 is converted into digital form with the A/D converter 45. The second converted data is output as original image data into the shading correction section 48. The shading correction section 48 performs a shading correction on the second image data based on the second shading data stored in the one-line memory 47. The image corrected data is temporally stored in the image memory 49 in Step S164.

After outputting the first image data from the shading correction section 44, the image reading apparatus 1 outputs the second image data in Step S165. Reading and outputting operations of both sides of the sheet P are thus completed.

In Step S170 in FIG. 6, the image reading apparatus 1 rotates the pair of paper output rollers 18 to eject the sheet P onto the paper output tray.

In Step 180, when any sheet of paper remains on the document table, the operation returns to Step S130 to repeat the steps described above on another sheet. When no sheet of paper remains on the document table, that is, all the sheets of paper have been processed, the operation goes to END.

The above embodiment describes the image reading apparatus 1 configured to read the double-sided original document including the fixed second CCD 21 with the white reference unit 32 movably attached. The present invention, however, is not limited to the image reading apparatus for reading double-sided sheets. The present invention may be applied in a similar manner to an image reading apparatus configured to read a single-sided original document, and can include a fixed reader such as a CCD. A motor can be used to provide the driving force to the white reference section 32.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. 2003-066781 filed on Mar. 12, 2003 in the Japanese Patent Office, the entire contents of which is incorporated by reference herein.

What is claimed is:

1. An image reading apparatus, comprising:
   a reader configured to read one side of an original document being conveyed at a reading position;
   a contact glass comprising a surface configured to contact the original document;
   a reference disposed at a side of the contact glass opposite to the surface and configured to be movable between the reading position and a standby position, the reference comprising a surface configured to face the reader, the surface having a predetermined color to provide shading data used for a shading correction;
   a carrier configured to move the reference to the reading position; and
   guiding members configured to guide the reference moving between the standby position and the reading position above the standby position,
   wherein the reader is configured to obtain the shading data by reading the predetermined color on the surface of the reference at the reading position and to read the predetermined color on the surface of the reference at a plurality of locations as the reference slides down towards the standby position from the reading position when the carrier is deactivated.

2. The image reading apparatus according to claim 1, wherein the reader is configured to read the predetermined color on the surface of the reference at a plurality of locations to obtain data.

3. The image reading apparatus according to claim 2, further comprising: a calculator configured to average the data to obtain the shading data.

4. The image reading apparatus according to claim 2, wherein the reader is configured to sequentially read the predetermined color on the surface of the reference at a plurality of locations according to a motion of the reference.

5. The image reading apparatus according to claim 1, wherein the reference comprises a reference sheet having the surface and a transparent member covering the surface of the reference sheet configured to face the reader.

6. The image reading apparatus according to claim 5, further comprising:
   a cleaner configured to contact the transparent member and to perform cleaning on a surface of the transparent member facing the reader according to a movement of the reference between the reading position and standby position.

7. An image reading apparatus, comprising:
   reading means for reading one side of an original document being conveyed at a reading position;
   contacting means for contacting the original document;
   reference providing means for providing a predetermined color surface between the reading means and the contacting means, the reference providing means configured to be movable between the reading position and a standby position, the reference providing means comprising a surface configured to face the reading means, the surface having a predetermined color to provide shading data used for a shading correction;
   carrying means for moving the reference providing means to the reading position; and guiding means for guiding the reference providing means moving between the standby position and the reading position above the standby position, wherein the reading means is configured to obtain the shading data by reading the predetermined color surface of the reference providing means at the reading position and to read the predetermined color surface of the reference providing means at a plurality of locations on the surface as the reference providing means slides down towards the standby position from the reading position when the carrying means is deactivated.

8. The image reading apparatus according to claim 7, wherein the reading means is configured to read the predetermined color surface of the reference providing means at a plurality of locations on the surface to obtain data.

9. The image reading apparatus according to claim 8, further comprising: calculating means for averaging the data to obtain the shading data.

10. The image reading apparatus according to claim 9, wherein the reading means is configured to sequentially read the predetermined color surface of the reference providing means at a plurality of locations on the surface according to a motion of the reference providing means.

11. The image reading apparatus according to claim 7, wherein the reference providing means comprises a sheet having the predetermined color surface, and protecting means for covering the sheet.

12. The image reading apparatus according to claim 11, further comprising:

cleaning means for cleaning a surface of the protecting means facing the reading means according to a movement of the reference providing means between the reading position and standby position.

13. An image reading method, comprising:

providing a reader configured to read one side of an original document being conveyed at a reading position;

providing a contact glass comprising a surface configured to contact the original document at the reading position;

disposing a reference at a side of the contact glass opposite to the surface, the reference being configured to be movable between the reading position and a standby position, the reference comprising a surface facing the reader, the surface having a predetermined color configured to provide shading data used for a shading correction;

moving the reference to the reading position;

reading the predetermined color on the surface of the reference at the reading position with a reader to obtain read data;

obtaining the shading data from the read data;

providing guiding members configured to guide the reference moving between the standby position and the reading position above the standby position;

permitting the reference to slide down to the standby position from the reading position; and reading the predetermined color on the surface of the reference at a plurality of locations on the surface with the reader as the reference slides to the standby position.

14. The method according to claim 13, wherein the predetermined color on the surface of the reference is read at a plurality of locations on the surface to obtain the read data.

15. The method according to claim 14, further comprising: averaging the read data to obtain the shading data.

16. The method according to claim 14, wherein the predetermined color on the surface of the reference is read at a plurality of locations on the surface according to a motion of the reference.

17. The method according to claim 13, wherein the reference comprises a sheet and a transparent member covering the sheet.

18. The method according to claim 17, further comprising:

cleaning off a surface of the transparent member facing the reader according to a movement of the reference between the reading position and standby position.

* * * * *